US00RE36425E

United States Patent [19]

Benno

[11] E Patent Number: Re. 36,425

[45] Reissued Date of Patent: Dec. 7, 1999

[54] PACKAGING METHOD AND PACKAGING ASSEMBLY FOR PACKAGES ASSEMBLED WITH A PALLET OR THE LIKE

[76] Inventor: Edward L. Benno, 17960 W. Hwy. 120, Grayslake, Ill. 60030

[21] Appl. No.: 09/067,748

[22] Filed: Apr. 28, 1998

Related U.S. Patent Documents

Reissue of:

[64] Patent No.: 5,638,950
Issued: Jun. 17, 1997
Appl. No.: 08/566,687
Filed: Dec. 4, 1995

[51] Int. Cl.[6] ..... B65D 71/00

[52] U.S. Cl. ..... 206/144; 53/449; 206/386; 206/430

[58] Field of Search ..... 53/398, 399, 449; 206/144, 192, 386, 427, 430, 432, 499, 509, 597, 821

[56] References Cited

U.S. PATENT DOCUMENTS

| | | | |
|---|---|---|---|
| 2,888,164 | 5/1959 | Corwin | 206/432 |
| 4,098,400 | 7/1978 | Brown | 206/821 |
| 4,567,981 | 2/1986 | Headon | 206/432 |
| 4,735,321 | 4/1988 | Day | 206/597 |
| 5,016,761 | 5/1991 | Stoddard et al. | 206/821 |
| 5,035,323 | 7/1991 | Daniels et al. | 206/432 |
| 5,330,050 | 7/1994 | Stansbury, Jr. et al. | 206/386 |

*Primary Examiner*—Jim Foster

[57] ABSTRACT

A packaging method for unitizing or interlocking a large number of beverage multipackages together on a portable platform or pallet. The invention also comprises an assembly of unitized packages on a portable platform and includes the use of packages with upstanding handles and close slots in the bottom walls thereof which permit the handle of one package to telescope into the close slot of another of the packages. The invention also uses sheets between interlocked packages to unitize adjacent interlocked packages.

6 Claims, 1 Drawing Sheet

PACKAGING METHOD AND PACKAGING ASSEMBLY FOR PACKAGES ASSEMBLED WITH A PALLET OR THE LIKE

Matter enclosed in heavy brackets [ ] appears in the original patent but forms no part of this reissue specification; matter printed in italics indicates the additions made by reissue.

BACKGROUND OF THE INVENTION

The invention relates to the art of secondary packaging such as multipackages of beverages for consumers, and primarily to the making, distributing and selling of consumer multipackages as a unitary assembly with a portable platform such as a pallet. Pallet assemblies of consumer packages are being used more and more in that assemblied condition throughout the entire path from manufacturer to consumer. In addition to motor vehicles, hand trucks and fork-lift trucks are used to move the pallet loads of consumer packages directly to selling sites in the stores.

Presently many large supermarket and warehouse store operations require the beverage producer or distributor to be responsible for placing the multipackages virtually in the hands of the consumer. Starting at the producer's plant, packages such for example as 12-packs or 24-packs are stacked on pallets. Commonly by using fork-lift trucks the producer moves the pallet loads as completed either into his warehouse or directly into a delivery truck. The producer then drives the truck to scheduled retail stores. At large supermarket or warehouse stores the producer generally will use a hand truck to remove an entire pallet load of beverage packages and carry the pallet load directly into the store on the retailer's selling floor as directed by the retailer. After preparing the pallet load for sale of the individual packages, on occasion the producer's employee may even stay in the store next to the display and place the beverage packages in the consumer's shopping cart.

SUMMARY OF THE INVENTION

The invention is directed to a method for making pallet loads of secondary food or beverage packages, and also to the assemblies of such packages. The primary object of the invention is to use a low cost, environmentally sound, consumer friendly, secondary package to assemble pallet loads of the secondary packages by a method and in an assembly that is low cost, efficient, and environmentally advantageous, from the point at which the secondary packages are made to the hands of a consumer in a store.

A feature of the invention is the unique use of packages such as taught in U.S. Pat. No. 5,168,989 in the practice of the invention.

Other objects and features of the invention will be apparent upon a persual of the hereinafter following detailed description read in conjunction with the drawings.

DETAILED DESCRIPTION OF THE INVENTION

The detailed description of the invention can be more readily understood by a study of the secondary packages shown and described in U.S. Pat. No. 5,168,989 which by reference is incorporated herein.

Figure 1:
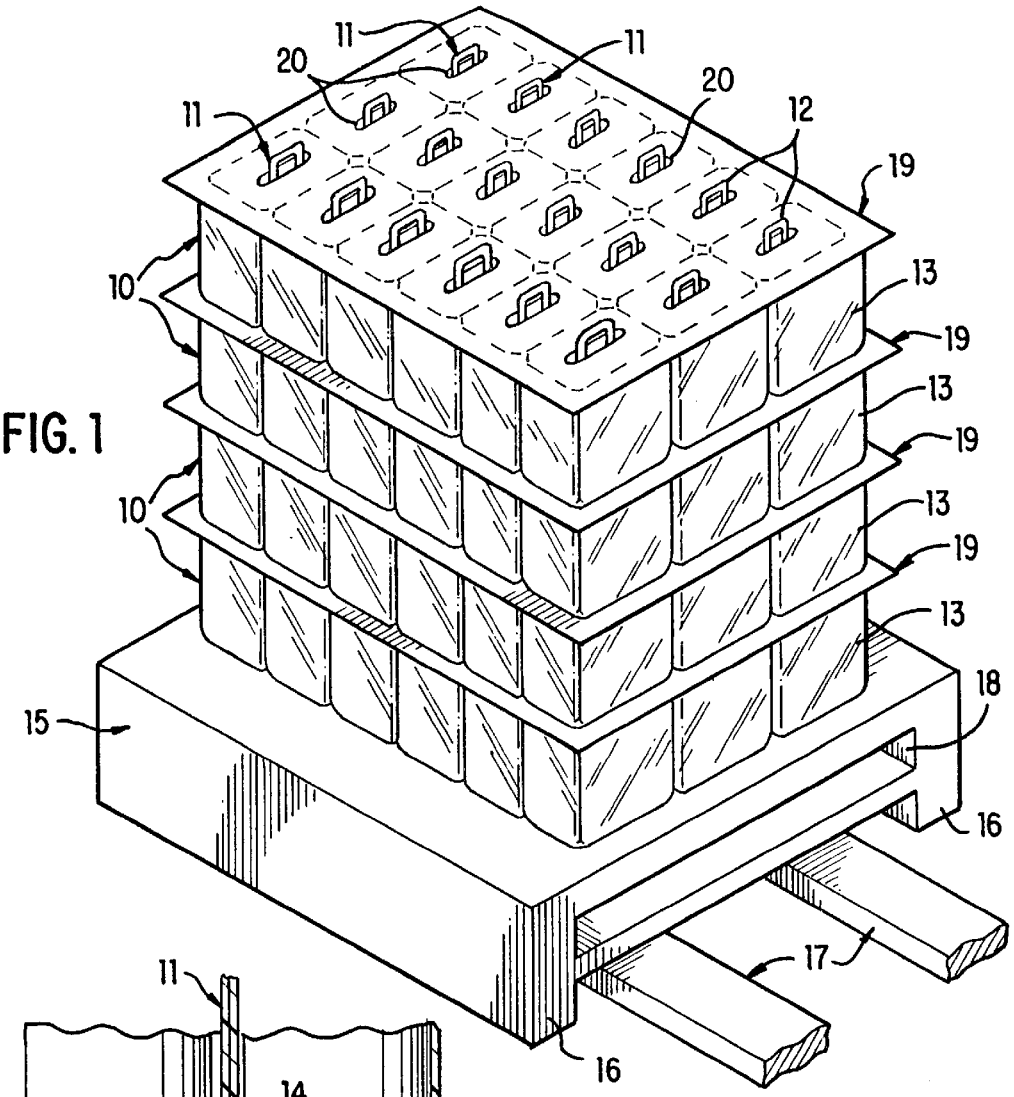
FIG. 1 is an isometric view of a preferred embodiment of an assembly of the invention.
Figure 2:
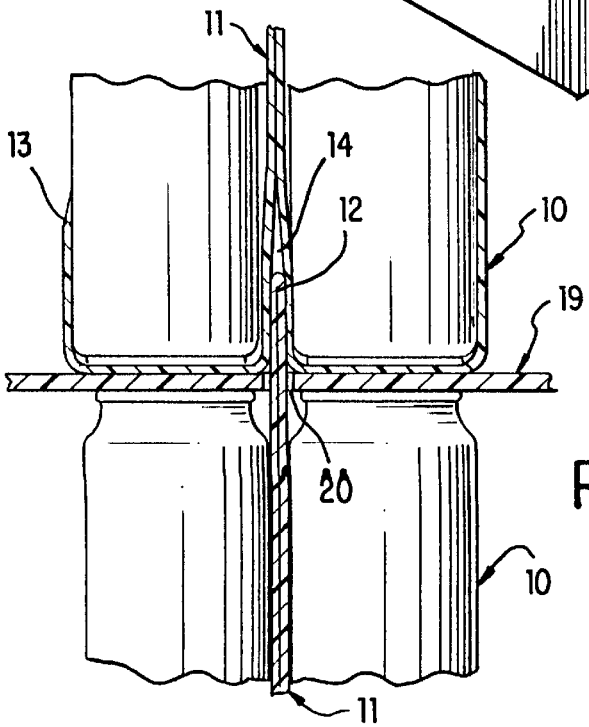
FIG. 2 is an enlarged fragmentary elevational view of a portion of the assembly of FIG. 1 to show how the packages are all interlocked through and with the layer separating sheets.

As taught in that patent, each of the packages 10 of FIGS. 1 and 2 comprises an upstanding central paperboard member 11. As shown in FIGS. 6 and 7 of the noted patent, the member 11 is conveniently made of an elongated paperboard strip transversely folded at the longitudinal center to form an upstanding upper handle section with finger openings provided therethrough. From the handle section the folded paperboard strip extends downwardly between a plurality of primary packages such as cans. Within the scope of the invention the primary packages could have other shapes such as bottle-like. The lower end portions of the paperboard strip are folded outwardly and thence upwardly a short distance along two lower outer opposed surfaces of the containers. A stretched and tensioned tube of a thin plastics material film such as polyethylene is positioned about the containers and the described paperboard strip below the handle section to complete the package. The upstanding handle section is indicated at 12 in FIG. 1. The stretched and tensioned film tube is indicated at 13 in FIGS. 1 and 2. The portion of the package 10 below the handle 11 may be called the body section of the package. As seen at 14 in FIG. 2 at the lower end of the body section of each package 10 there is a close slot 14 extending upwardly from the lower surface of the body section. The stretched and tensioned film tube 13 maintains the close slot 14 resiliently closed.

In a preferred embodiment of the invention a portable platform 15 is provided. The upper surface of the platform 15 is relatively flat and between the vertical legs 16 thereof there is a slot for lifting and carrying members 17 such as the tines of a hand truck or a fork-lift truck. The upper surface of the platform 15 can be provided with a curb thereabout if there arises a fear that the beverage load may slide from the platform in transport and handling. Preferably, a slot 18 is provided in the platform 15 below the upper surface for the storage of the sheets 19 as the load of packages 10 is dismantled in the store. That arrangement permits all of the elements of the invention that are not sold to be returned to the beverage producer. Obviously, to the extent the platform or pallet 10 and the sheets 19 maintain sufficient integrity in use, they may be reused by the beverage producer to lower the cost of using the invention and to follow environmental goals.

In the assembly of the preferred embodiment shown in the drawing, the beverage producer in his plant takes a first number of completed packages 10 and sets them upon the platform 15 in a pattern of rows and ranks. This is conveniently done by the producer with a machine called a pallet loader which operates to take packages from the package assembling machine and position them on the pallet. The number of packages 10 shown in each layer in the drawing, eighteen, is not a limiting factor in the invention.

After the first number of packages 10 is assembled on the platform 15, a sheet 19 is positioned on top of the packages 10. A number of identically formed sheets 19 are provided for the number of layers of packages 10. The sheets 19 are formed of a semi-rigid material such as paperboard. The paperboard may be coated with a varnish or plastics material to render it water-resistant and strong enough for repeated use. The sheets 19 are provided with a number of openings 20 therethrough. The openings 20 are arranged on each sheet 19 in the pattern of the rows and ranks of the upstanding handle sections 12 of the packages 10. Preferably the peripheral size and shape of the openings 20 should be slightly larger than the cross-sectional configuration of a handle section 12 so that a sheet 19 effectively locks an entire layer of packages 10 together as a unit.

When a sheet 19 is properly positioned on the first number of packages 10, the upstanding handle sections 12 will upstand above the sheet 19. A second number of packages 10 is then positioned in the same pattern of rows and ranks as the first number of package 10 on top of the first sheet 19. In so positioning the second number of packages 10, the close slots 14 of the second number of packages 10 will be telescopically applied over the handle sections 12 of the first number of packages 10. That arrangement or cooperation is shown in FIG. 2. The elastic and resilient tensioned tube 13 will resiliently close the close slot 14 against the upstanding handle section 12 of the first number of packages 10. Obviously, the lower portions of a package 10 may be spread outwardly by the thickness of a handle section 12. However, in reductions to practice of the invention, such spreading appeared unnoticeable with the thickness of the handle section at about one sixteenth of an inch.

Over the upstanding handle sections 12 of the second number of packages 10 a second sheet 19 is positioned. That is followed by a third number of packages 10 and a third sheet 19. In the embodiment shown in the drawing, four layers of packages 10 and four sheets 19 are used to complete the assembly. In commercial uses the total height of the assembly should be that which permits consumers to easily reach the upper packages.

In use in a store, after the beverage producer or distributor has placed the assembly in a store aisle, it is only necessary to manually remove the uppermost sheet 19 and slide it into the slot 18. Consumers need then merely grasp the handle section 12 of one of the uppermost packages and easily lift the package from the assembly and place it in their shopping cart. After the uppermost layer of packages have been removed and sold, someone should remove the next sheet 19 and slide it into the slot 18. If not removed immediately, a consumer can easily lift one corner of the next sheet 19 and take a package 10.

During the entire life of the assembly in a store it remains a secure and safe arrangement substantially locked against accidental destruction by a jarring or striking of the assembly.

Having described the invention, it is to be understood that changes can be made in the described embodiment by a person skilled in the art within the spirit and scope of the claims.

I claim:

1. A packaging method for a plurality of packages, wherein each of said packages comprises a body section having a handle section upstanding from the upper surface of said body section and further having a close slot extending upwardly into said body section from the lower surface of said body section with said slot having a configuration capable of telescopically closely receiving the handle section of another of said packages therewithin, comprising the steps of:

providing a portable platform for carrying said plurality of packages, positioning a first number of said packages on said platform with the handle sections thereof upstanding in a pattern [of rows and ranks], providing a sheet having the general configuration of the upper surface of said platform, providing said sheet with a plurality of openings shaped to permit said handle sections to extend therethrough and being arranged in said pattern [of rows and ranks], positioning said sheet on top of said first number of said packages with said handle sections thereof upstanding through said openings, positioning a second number of said packages on said sheet with said slots of each of said second number of packages telescopically applied over one of said upstanding handle sections of said first number of said packages to closely hold said handle sections, providing a second sheet substantially in duplicate of said sheet, positioning said second sheet on top of said second number of said packages with said handle sections of said second number of said packages upstanding through the openings of said second sheet, and providing elastic resilient means on each of said packages for resiliently closing said close slot of each package.

2. A portable unitary assembly of a plurality of packages, each of said packages comprising a body section having generally flat planar upper and lower surfaces, a handle section upstanding from said upper surface, a close slot extending upwardly into said body section from said lower surface and having a configuration capable of telescopically closely receiving the handle section of another of said packages therewithin, a portable platform, a first number of said packages positioned on said platform with the handle sections thereof upstanding in a pattern [of rows and ranks], a sheet having the general configuration of the upper surface of said platform, said sheet having a plurality of openings shaped to permit said handle sections to extend therethrough and arranged in said pattern [of rows and ranks], said sheet mounted on top of said first number of said packages with said handle sections of said packages extending upwardly through said openings of said sheet, a second number of said packages positioned on said sheet with the slots of each of said second number of packages telescopically mounted over one of said upstanding handle sections of said first number of said packages extending upwardly through said sheet, a second sheet formed substantially as a duplicate of said sheet, and said second sheet mounted on top said second number of packages with said handle sections of said second number of packages extending upwardly through the openings of said second sheet, said portable platform being shaped as a pallet to permit the tines of a fork-lift truck to enter and lift said platform to carry said unitary assembly, and each of said packages having elastic means on said body section thereof for resiliently closing said close slot thereof.

3. In an assembly as defined in claim 2, said body section of each of said packages further comprising a plurality of containers arranged between said planar upper and lower surfaces and on both sides of said slot.

4. In an assembly as defined in claim 3, the handle section of each of said packages comprising folded paperboard with finger holds therethrough, said paperboard extending downwardly between said containers to form the opposed sidewalls of said slot.

5. In an assembly as defined in claim 4, and said elastic means comprising an elastic band stretched and tensioned circumferentially about said containers and said paperboard between said containers to resiliently close said close slot.

6. A portable unitary assembly of a plurality of packages, each of said packages comprising a body section having generally flat planar upper and lower surfaces, a handle section upstanding from said upper surface, a close slot extending upwardly into said body section from said lower surface and having a configuration capable of telescopically closely receiving the handle section of another of said packages therewithin, a portable platform, a first number of said packages positioned on said platform with the handle sections thereof upstanding in a pattern [of rows and ranks], a sheet having the general configuration of the upper surface of said platform, said sheet having a plurality of openings shaped to permit said handle sections to extend therethrough and arranged in said pattern [of rows and ranks], said sheet mounted on top of said first number of said packages with said handle sections of said packages extending upwardly through said openings of said sheet, a second number of said packages positioned on said sheet with the slots of each of said second number of packages telescopically mounted over one of said upstanding handle sections of said first number of said packages extending upwardly through said sheet, and said body section of each of said packages further comprising a plurality of containers arranged between said planar upper and lower surfaces and on both sides of said slot.

* * * * *